(12) United States Patent
Lin et al.

(10) Patent No.: US 12,279,370 B2
(45) Date of Patent: Apr. 15, 2025

(54) HYBRID THROUGH HOLE FOR SOLID STATE INTRUSION DETECTION

(71) Applicant: DELL PRODUCTS L.P., Round Rock, TX (US)

(72) Inventors: Yong-Teng Lin, Yilan (TW); Bradford Edward Vier, Taipei (TW); Chun-Kai Tzeng, KeeLung (TW); Chin-Yao Hsu, Kaohsiung (TW); Yu-Lin Tsai, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 17/969,844

(22) Filed: Oct. 20, 2022

(65) Prior Publication Data

US 2024/0135043 A1 Apr. 25, 2024
US 2024/0232444 A9 Jul. 11, 2024

(51) Int. Cl.
*H05K 1/11* (2006.01)
*G06F 1/18* (2006.01)
*G06F 21/79* (2013.01)
*G08B 13/12* (2006.01)
*H05K 5/02* (2006.01)

(52) U.S. Cl.
CPC ............ *H05K 1/115* (2013.01); *G06F 1/183* (2013.01); *G06F 21/79* (2013.01); *G08B 13/128* (2013.01); *H05K 5/0208* (2013.01)

(58) Field of Classification Search
CPC ...... H05K 1/115; H05K 5/0208; G06F 1/183; G06F 21/79; G06F 21/86; G08B 13/128
USPC .......................................................... 361/10
See application file for complete search history.

(56) References Cited

U.S. PATENT DOCUMENTS

| | | | |
|---|---|---|---|
| 5,790,670 A * | 8/1998 | Bramlett | G08B 13/1409 361/672 |
| 6,191,503 B1 | 2/2001 | Kitten et al. | |
| 2002/0014962 A1* | 2/2002 | Miglioli | G08B 13/22 340/568.1 |
| 2005/0088303 A1* | 4/2005 | Allen | G08B 13/149 340/568.4 |
| 2014/0001150 A1* | 1/2014 | Lecesse | H05K 3/42 156/345.1 |
| 2017/0249813 A1* | 8/2017 | Busby | G08B 13/12 |
| 2021/0225159 A1 | 7/2021 | Grobelny et al. | |

FOREIGN PATENT DOCUMENTS

WO WO-2014170333 A2 * 10/2014 ........... H05K 5/0208

* cited by examiner

*Primary Examiner* — Scott Bauer
*Assistant Examiner* — Sreeya Sreevatsa
(74) *Attorney, Agent, or Firm* — Larson Newman, LLP (57) ABSTRACT

An information handling system includes a printed circuit board, a screw, and a processor. The printed circuit board includes a through hole via. The through hole via includes top and bottom sections plated with a conductive plating material, and a middle section without any conductive plating material. The screw is in physical communication with the top, middle, and bottom sections of the through hole via in the printed circuit board. The processor determines whether an electrical circuit is formed between the screw, the top section of the through hole via, and the bottom section of the through hole via. Based on the determination of the electrical circuit being formed, the processor provides an indication that no intrusion has been made into the information handling system.

16 Claims, 7 Drawing Sheets

HYBRID THROUGH HOLE FOR SOLID STATE INTRUSION DETECTION

FIELD OF THE DISCLOSURE

This disclosure generally relates to information handling systems, and more particularly relates to a hybrid through hole for solid state intrusion detection.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a printed circuit board, a screw, and a processor. The printed circuit board includes a through hole via. The through hole via includes top and bottom sections plated with a conductive plating material, and a middle section without any conductive plating material. The screw in physical communication with the top, middle, and bottom sections of the through hole via in the printed circuit board. The processor may determine whether an electrical circuit is formed between the screw, the top section of the through hole via, and the bottom section of the through hole via. Based on the determination of the electrical circuit being formed, the processor may provide an indication that no intrusion has been made into the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
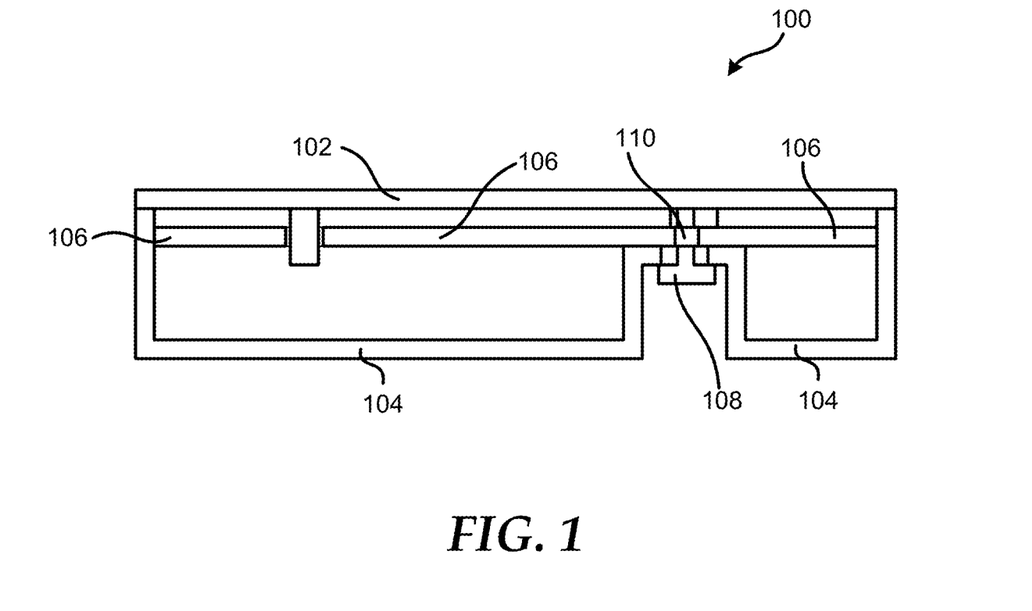
FIG. 1 is a diagram of a portion of an information handling system according to an embodiment of the present disclosure.

FIG. 1 is a diagram of an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base cover 102, a service panel 104, a printed circuit board 106, a screw 108, and a conductive sleeve 110. In an example, base cover 102 may be referred to as a c-cover, and service panel 104 may be referred to as a d-cover. In certain examples, screw 108 may be utilized to secure base cover 102 and service panel 104 together. In an example, conductive sleeve may be any suitable conductive material, such as a conductive rubber. Information handling system 100 may include additional component, such as processor 1002 of FIG. 10, without varying from the scope of this disclosure.

In previous information handling systems, a chassis intrusion prevention component may be used to control or lock features, and may be intended to deter unauthorized access to all components inside the chassis of the information handling system. If a product is left unlocked, unauthorized access inside the product can result in component theft, component tampering, or implanting malware. In previous information handling systems, an intrusion switch design may be impacted by excess chassis deformation, and a warranty sticker design may provide another approach to detect the chassis intrusion by tampering.

Figure 2:
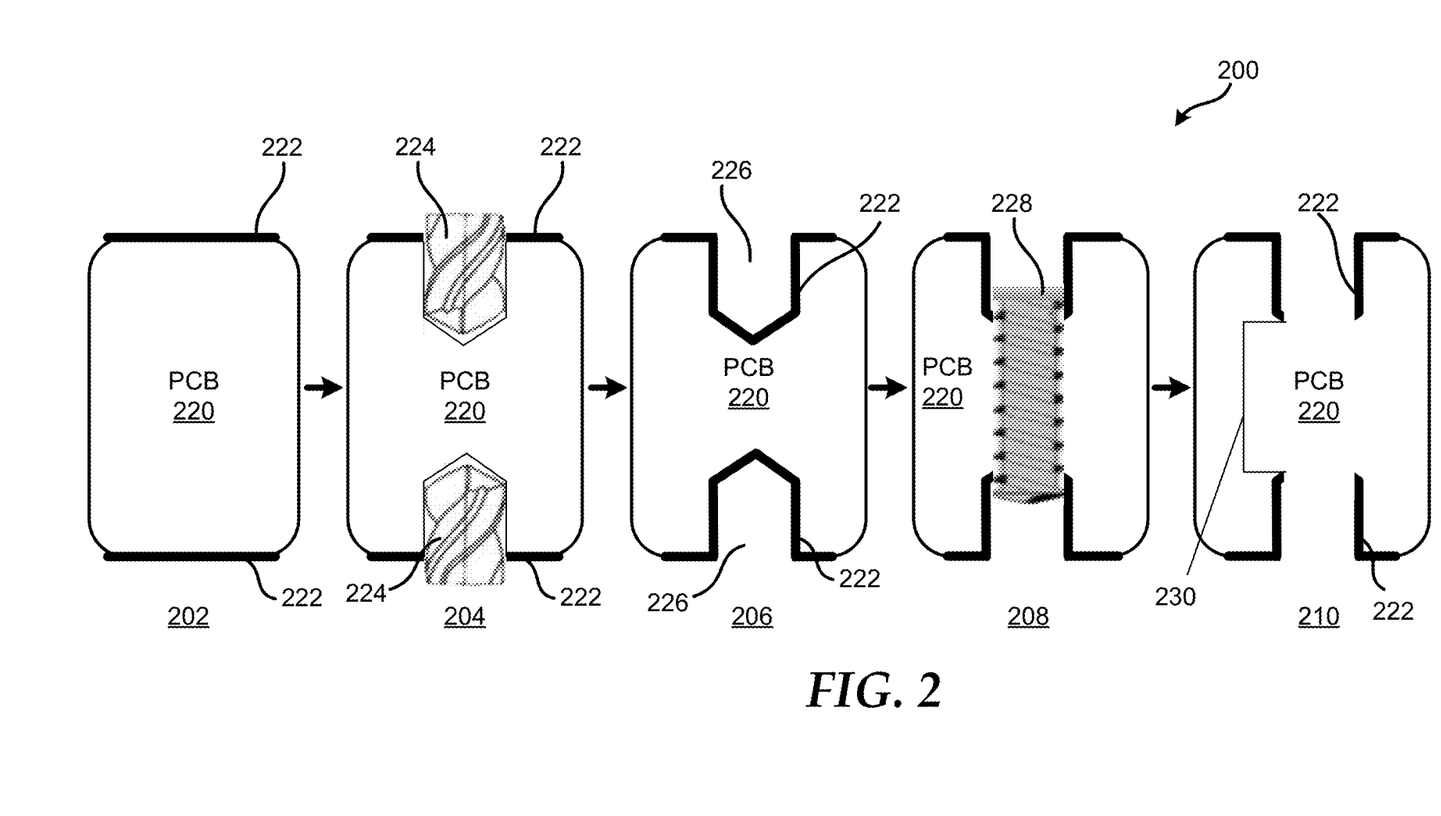
FIG. 2 is a diagram of a sequence creating a hybrid through hole for solid state intrusion detection according to an embodiment of the present disclosure.

FIG. 2 illustrates a sequence 200 for creating a hybrid through hole for solid state intrusion detection according to an embodiment of the present disclosure. In an example, sequence 200 includes operations 202, 204, 206, 208, and 210. At operation 202, top and bottom surfaces of a PCB 220 is plated with a conductive plating material 222. In an example, the conductive plating material 222 may be any suitable material, such as copper. At operation 204, PCB is blind drilled 224 through conductive plating material 222 on the top and bottom surfaces. In an example, depth control may be utilized during the blind drilling to ensure proper depth of the holes into PCB 220.

At operation 206, holes 226 within PCB 220 are plated within conductive plating material 222. At operation 208, a drill 228 may provide another drilling operation to create a through hole within PCB 220. In an example, drill 228 may remove conductive plating material 222 from the center of both holes 226 within PCB 220. At operation 210, drill 228 is removed from PCB 220 and a section 230 of the PCB is formed without any conductive plating material. After completion of sequence 200, PCB 220 includes a through hole with conductive plating 222 on top and bottom portions and no plating in a center portion.

Figure 3:
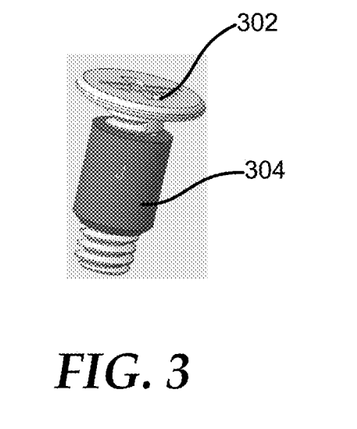
FIG. 3 is a perspective view of a screw with a conductive sleeve according to an embodiment of the present disclosure.

FIG. 3 illustrates a screw 302 with a conductive sleeve 304 according to an embodiment of the present disclosure. In an example, conductive sleeve 304 may be any suitable material, such as a conductive rubber. In this example, conductive sleeve 304 may be inserted within a first portion of a through hole in a PCB. Conductive sleeve 304 may provide proper alignment of screw 302 within the PCB.

Figure 4:
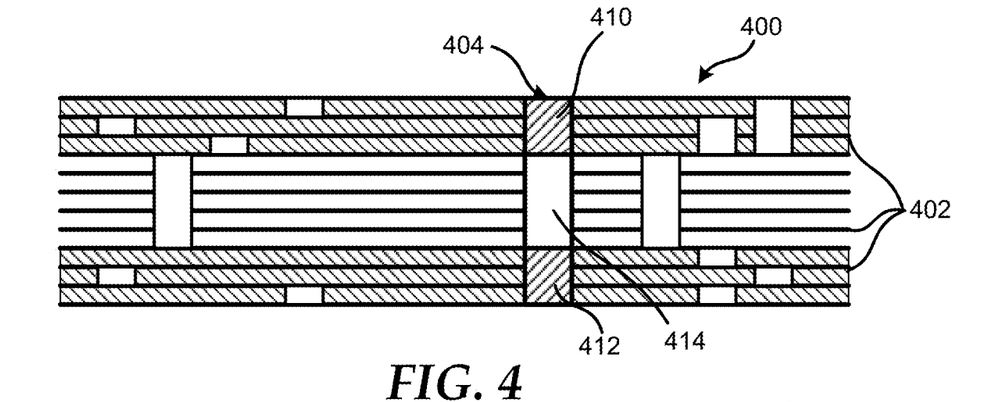
FIG. 4 is a diagram of a through hole for solid state intrusion detection in a high density interconnect printed circuit board (PCB) according to an embodiment of the present disclosure.
Figure 5:
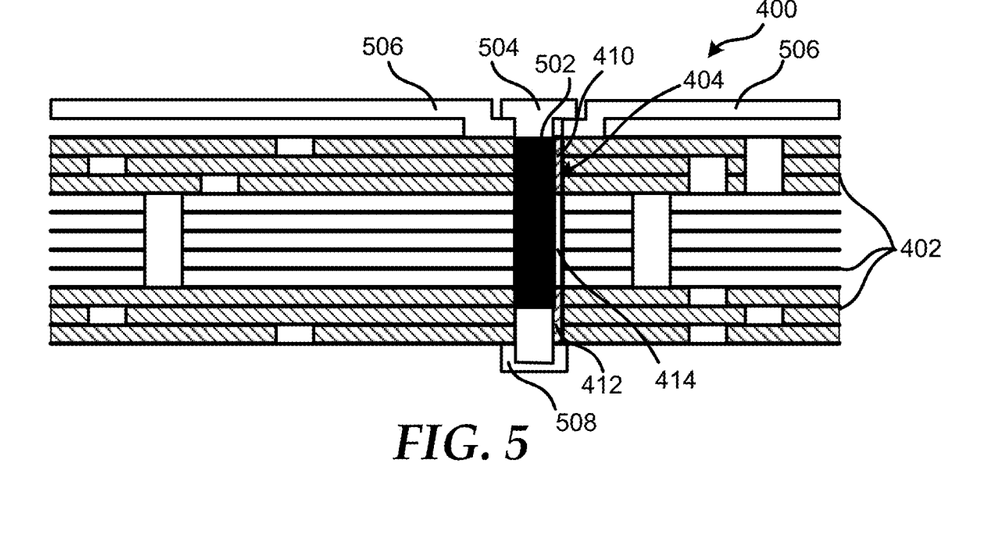
FIG. 5 is a diagram of a screw within a through hole for solid state intrusion detection in a high density interconnect PCB according to an embodiment of the present disclosure.

FIGS. 4 and 5 illustrate a PCB 400 with multiple layers 402, and a through hole 404 according to an embodiment of the present disclosure. In an example, PCB 400 may be a high density interconnect (HDI) PCB. In certain examples, through hole 404 may be created using any suitable process including, but not limited to, sequence 200 of FIG. 2. For example, a blind drilled hole may be created in a top surface of PCB 600, and another blind drilled hole in a bottom surface of the PCB. After the holes or vias have been drilled, conductive plating may be added over the surfaces of the holes. Then, a second hole may be drilled through the center of the two holes to connect the holes and create a through hole or via.

After through hole 404 is created, the through hole 404 includes portions or sections 610, 612, and 414. In an example, sections 410 and 412 may have the conductive plating material, such as conductive plating material 222 of FIG. 2, around inside surface of through hole 404. Section 414 may not have the conductive plating material around the inside surface of through hole 404. In this configuration, current may not flow from section 410 to section 412 of through hole 404 based on section 414 not having any conductive plating material.

Referring now to FIG. 5, a conductive sleeve 502 may be inserted within PCB 400. In certain examples, conductive sleeve 502 may extended from top section 410, through middle section 414, and into bottom section 412. In an example, conductive sleeve 502 may be any suitable material, such as a conductive rubber. Once inserted within PCB 400, conductive sleeve 502 may provide proper alignment of a screw 504 within the PCB. In an example, screw 504 may be inserted through a service panel 506, through conductive sleeve 502, and into c-cover 508. Conductive sleeve 502 may provide an electrical connection between screw 504 and sections 410 and 412. Based on this electronical connection, an electrical circuit may be created from section 410, conductive sleeve 502, screw 504, and section 412. In an example, screw 504 may be slightly offset from a center of through hole 404. In this example, the offset of screw 504 may avoid plating damage from the screw along the through hole.

Figure 10:
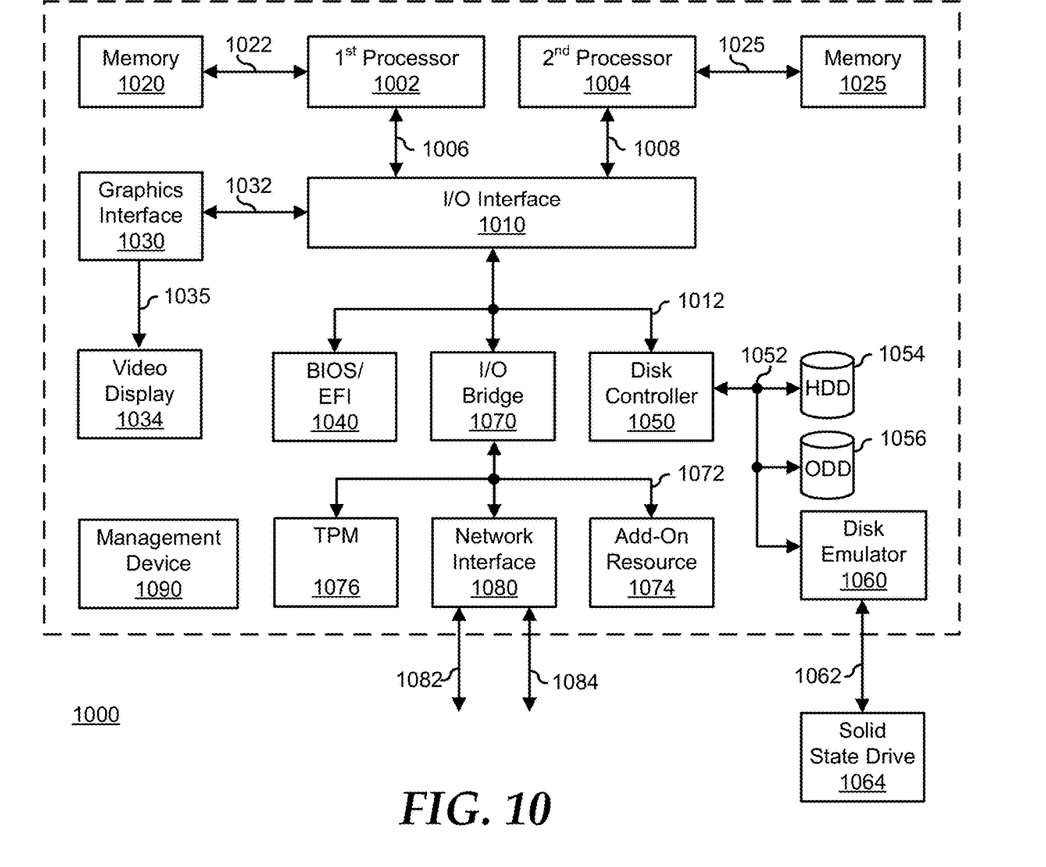
FIG. 10 is a block diagram of a general information handling system according to an embodiment of the present disclosure.

In an example a processor, such as processor 1002 of FIG. 10, a baseboard management controller, or a general processor input/output (GPIO) device, may communicate or monitor the electrical circuit formed by section 410, conductive sleeve 502, screw 504, and section 412. In certain examples while the electrical circuit is formed or maintained, the processor may determine that no intrusion has been made into information handling system 100. For example, while screw 502 is in physical communication with service panel 506, conductive sleeve 502, section 412, and c-cover 508, an individual cannot get within information handling system 100.

However, if screw 504 is removed from service panel 506, conductive sleeve 502, section 412, and c-cover 508, an individual may remove the service panel and access components within the information handling system. If a processor, such as processor 1002 of FIG. 10, determines that the electrical circuit of section 410, conductive sleeve 502, screw 504, and section 412 is no longer formed, the processor may issue an intrusion alert. In an example, the processor may determine that the electrical circuit is no longer formed based on a detection of an open circuit.

Figure 6:
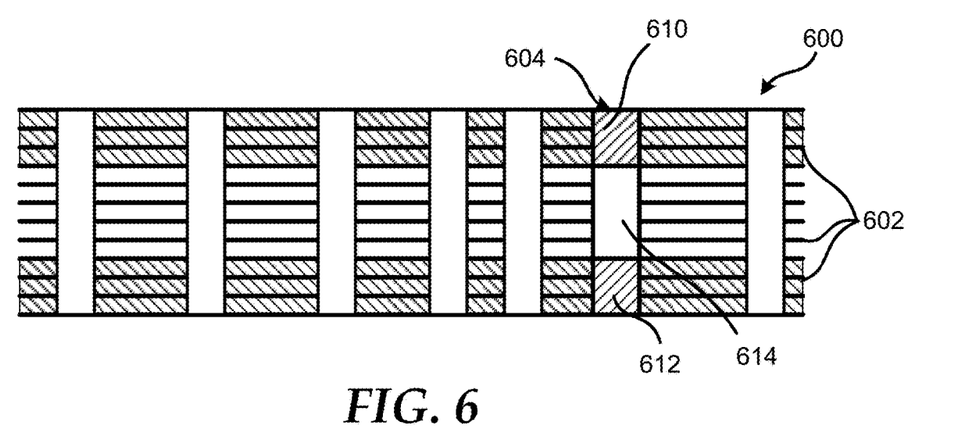
FIG. 6 is a diagram of a through hole for solid state intrusion detection in a multiple layer board PCB according to an embodiment of the present disclosure.
Figure 7:
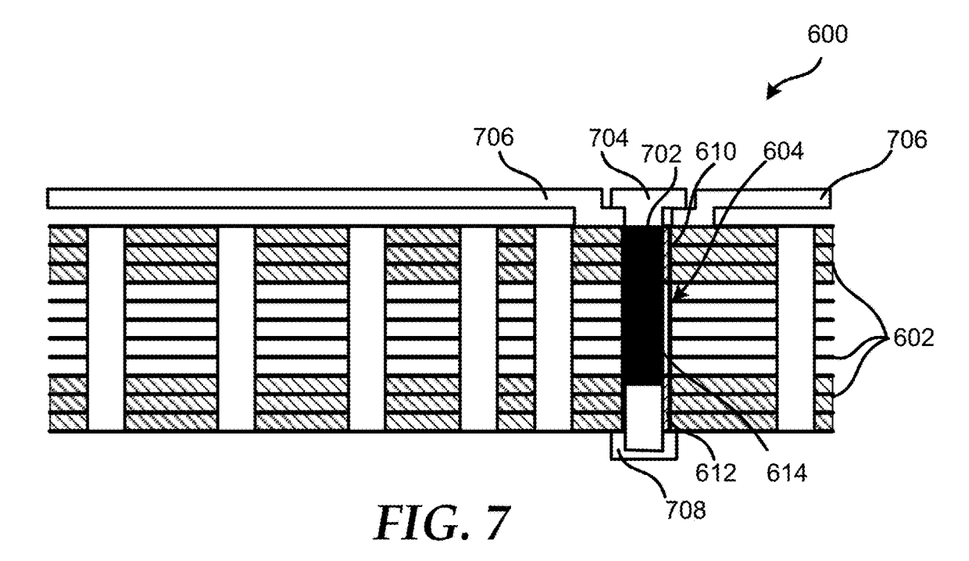
FIG. 7 is a diagram of a screw within a through hole for solid state intrusion detection in a multiple layer board PCB according to an embodiment of the present disclosure.

FIGS. 6 and 7 illustrate a PCB 600 with multiple layers 602 and a through hole 604 according to an embodiment of the present disclosure. In an example, PCB 600 may be a multiple layer board (MLB) PCB. In certain examples, through hole 604 may be created using any suitable process including, but not limited to, sequence 200 of FIG. 2. For example, a blind drilled hole may be created in a top surface of PCB 600, and another blind drilled hole in a bottom surface of the PCB. After the holes or vias have been drilled, conductive plating may be added over the surfaces of the holes. Then, a second hole may be drilled through the center of the two holes to connect the holes and create a through hole or via.

After through hole 604 is created, the through hole 604 includes portions or sections 610, 612, and 614. In an example, sections 610 and 612 may have the conductive plating material, such as conductive plating material 222 of FIG. 2, around inside surface of through hole 604. Section 614 may not have the conductive plating material around the inside surface of through hole 604. In this configuration, current may not flow from section 610 to section 612 of through hole 604 based on section 614 not having any conductive plating material.

Referring now to FIG. 7, a conductive sleeve 702 may be inserted within PCB 600. In certain examples, conductive sleeve 702 may extended from top section 610, through middle section 614, and into bottom section 612. In an example, conductive sleeve 702 may be any suitable material, such as a conductive rubber. Once inserted within PCB 600, conductive sleeve 702 may provide proper alignment of a screw 704 within the PCB. In an example, screw 704 may be inserted through a service panel 706, through conductive sleeve 702, and into c-cover 708. Conductive sleeve 702 may provide an electrical connection between screw 704 and sections 610 and 612. Based on this electronical connection, an electrical circuit may be created from section 610, conductive sleeve 702, screw 704, and section 612. In an example, screw 704 may be slightly offset from a center of through hole 604. In this example, the offset of screw 704 may avoid plating damage from the screw along the through hole.

In an example, a processor, such as processor 1002 of FIG. 10, a baseboard management controller, or a general processor input/output (GPIO) device, may communicate or monitor the electrical circuit formed by section 610, conductive sleeve 702, screw 704, and section 612. In certain examples, while the electrical circuit is formed or maintained, the processor may determine that no intrusion has been made into information handling system 100. For example, while screw 702 is in physical communication with service panel 706, conductive sleeve 702, section 612, and c-cover 708, an individual cannot get within information handling system 100.

However, if screw 704 is removed from service panel 706, conductive sleeve 702, section 612, and c-cover 708, an individual may remove the service panel and access components within the information handling system. If a processor, such as processor 1002 of FIG. 10, determines that the electrical circuit of section 610, conductive sleeve 702, screw 704, and section 612 is no longer formed, the processor may issue an intrusion alert. In an example, the processor may determine that the electrical circuit is no longer formed based on a detection of an open circuit.

Figure 8:
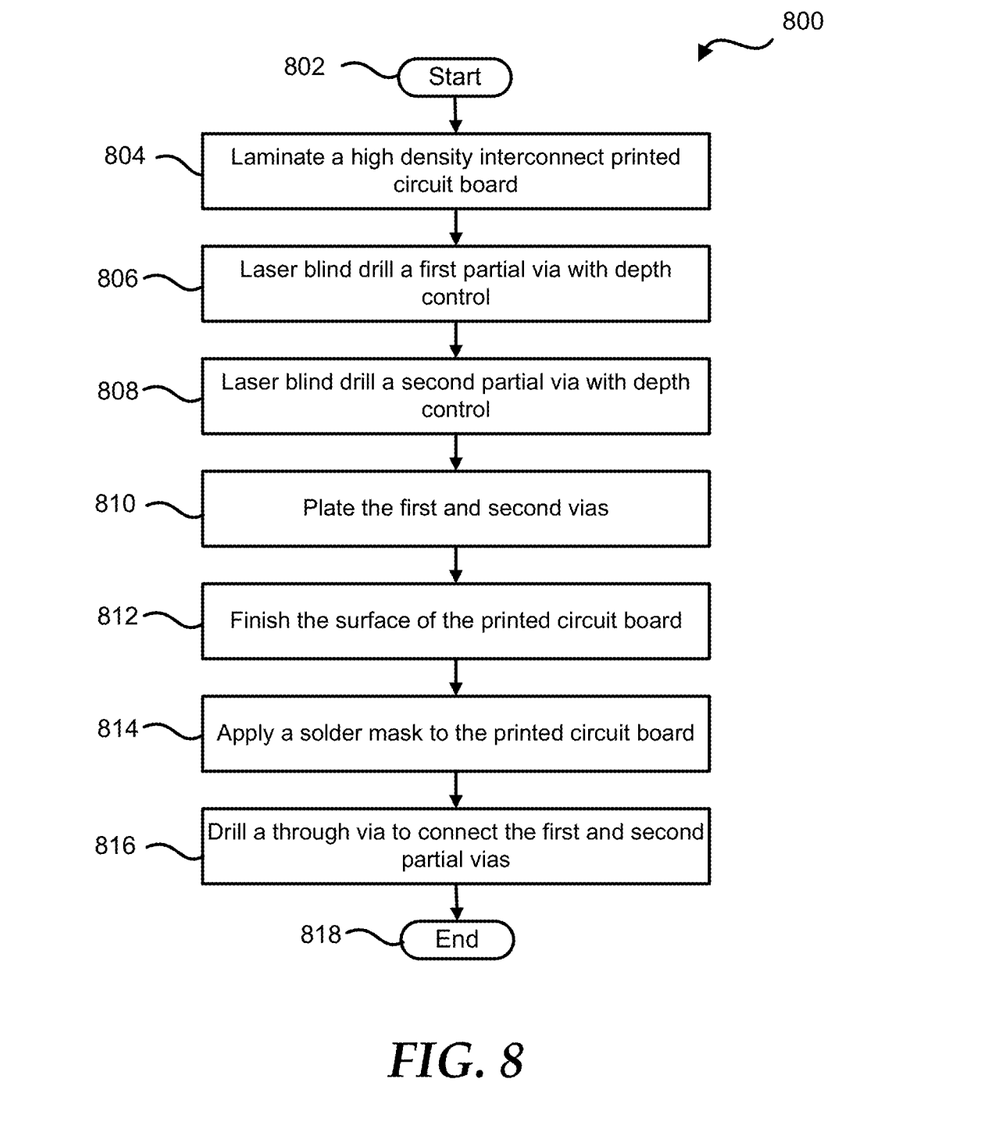
FIG. 8 is a flow diagram of a method for creating a hybrid through hole for solid state intrusion detection in a high density interconnect PCB according to an embodiment of the present disclosure.

FIG. 8 shows a method 800 for creating a hybrid through hole for solid state intrusion detection in a HDI PCB according to at least one embodiment of the present disclosure, starting at block 802. Not every method step set forth in this flow diagram is always necessary, and that certain steps of the methods may be combined, performed simultaneously, in a different order, or perhaps omitted, without varying from the scope of the disclosure.

At block 804, an outer portion of a HDI PCB is laminated. In an example, the lamination may be performed in any suitable manner known in the art. At block 806, a first blind via is laser drilled. In an example, the first blind via may be drilled into a top surface of the PCB. At block 808, a second blind via is laser drilled. In an example, the second blind via may be drilled into a bottom surface of the PCB. In certain examples, the laser drilling may be performed with depth control to accurately control the width and depth of the vias to create partial vias.

At block 810, the first and second blind vias are plated. In an example, the vias may be plated with a conductive plating material, such as copper. At block 812, the surface of the PCB is finished. In an example, the finishing of the surface may be performed in any suitable manner known in the art. At block 814, a solder mask is applied to PCB. In an example, the solder mask may be performed in any suitable manner known in the art. At block 816, a through hole via is drilled to connect the first and second partial vias and the flow ends at block 818. In an example, the through hole via includes top and bottom sections that are plated within the conductive plating material and a middle section that does not include any plating.

Figure 9:
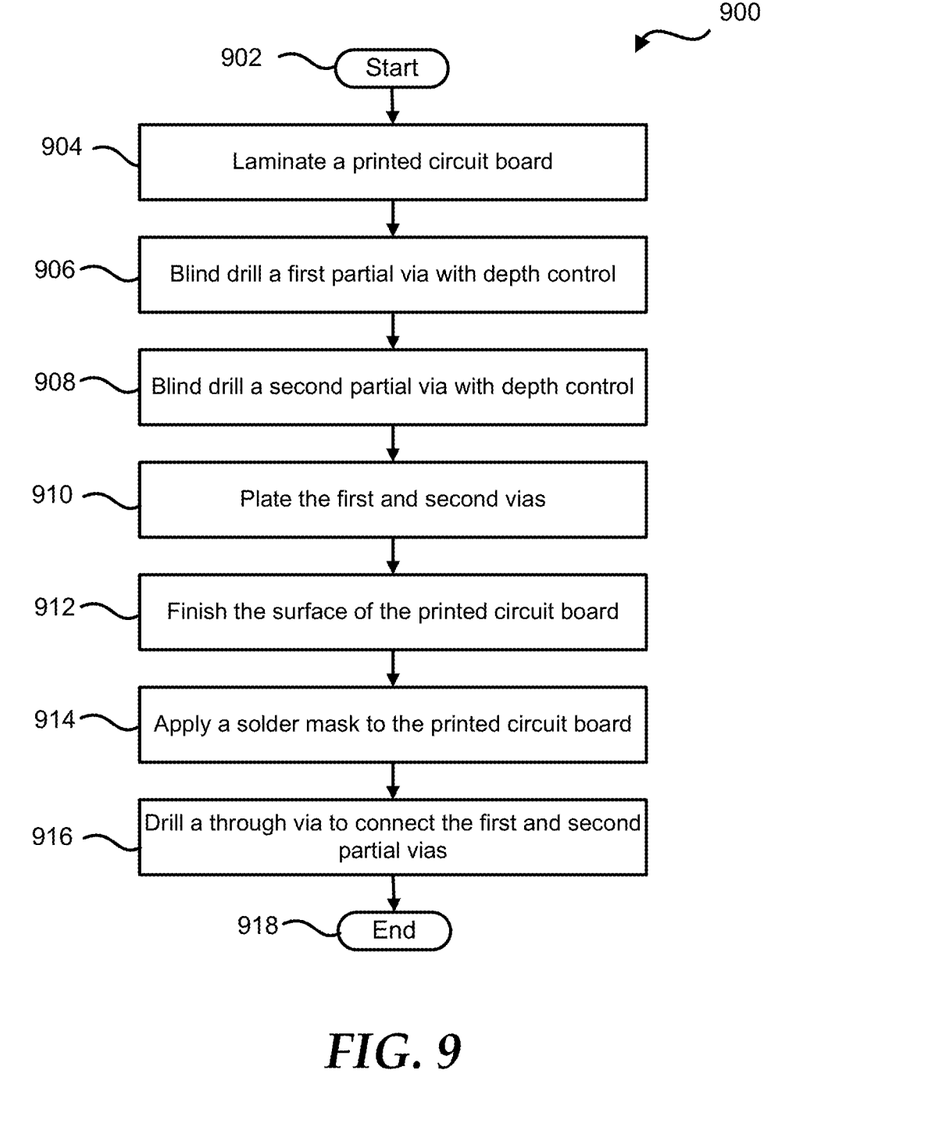
FIG. 9 is a flow diagram of a method for creating a hybrid through hole for solid state intrusion detection in a multiple layer board PCB according to an embodiment of the present disclosure.

FIG. 9 shows a method 900 for creating a hybrid through hole for solid state intrusion detection in a multiple layer board PCB according to at least one embodiment of the present disclosure, starting at block 902. Not every method step set forth in this flow diagram is always necessary, and that certain steps of the methods may be combined, performed simultaneously, in a different order, or perhaps omitted, without varying from the scope of the disclosure.

At block 904, an outer portion of a MLB PCB is laminated. In an example, the lamination may be performed in any suitable manner known in the art. At block 906, a first blind via is drilled. In an example, the first partial blind via may be drilled into a top surface of the PCB. At block 908, a second partial blind via is drilled. In an example, the second blind via may be drilled into a bottom surface of the PCB. In certain examples, the drilling may be performed with depth control to accurately control the width and depth of the partial vias.

At block 910, the first and second blind vias are plated. In an example, the vias may be plated with a conductive plating material, such as copper. At block 912, the surface of the PCB is finished. In an example, the finishing of the surface may be performed in any suitable manner known in the art. At block 914, a solder mask is applied to PCB. In an example, the solder mask may be performed in any suitable manner known in the art. At block 916, a through hole via is drilled to connect the first and second partial vias and the flow ends at block 918. In an example, the through hole via includes top and bottom sections that are plated within the conductive plating material and a middle section that does not include any plating.

FIG. 10 shows a generalized embodiment of an information handling system 1000 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1000 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1000 can include processing resources for executing machine-executable code, such as a central processing unit (CPU), a programmable logic array (PLA), an embedded device such as a System-on-a-Chip (SoC), or other control logic hardware. Information handling system 1000 can also include one or more computer-readable medium for storing machine-executable code, such as software or data. Additional components of information handling system 1000 can include one or more storage devices that can store machine-executable code, one or more communications ports for communicating with external devices, and various input and output (I/O) devices, such as a keyboard, a mouse, and a video display. Information handling system 1000 can also include one or more buses operable to transmit information between the various hardware components.

Information handling system 1000 can include devices or modules that embody one or more of the devices or modules described below and operates to perform one or more of the methods described below. Information handling system 1000 includes a processors 1002 and 1004, an input/output (I/O) interface 1010, memories 1020 and 1025, a graphics interface 1030, a basic input and output system/universal extensible firmware interface (BIOS/UEFI) module 1040, a disk controller 1050, a hard disk drive (HDD) 1054, an optical disk drive (ODD) 1056, a disk emulator 1060 connected to an external solid state drive (SSD) 1062, an I/O bridge 1070, one or more add-on resources 1074, a trusted platform module (TPM) 1076, a network interface 1080, a management device 1090, and a power supply 1695. Processors 1002 and 1004, I/O interface 1010, memory 1020, graphics interface 1030, BIOS/UEFI module 1040, disk controller 1050, HDD 1054, ODD 1056, disk emulator 1060, SSD 1062, I/O bridge 1070, add-on resources 1074, TPM 1076, and network interface 1080 operate together to provide a host environment of information handling system 1000 that operates to provide the data processing functionality of the information handling system. The host environment operates to execute machine-executable code, including platform BIOS/UEFI code, device firmware, operating system code, applications, programs, and the like, to perform the data processing tasks associated with information handling system 1000.

In the host environment, processor 1002 is connected to I/O interface 1010 via processor interface 1006, and processor 1004 is connected to the I/O interface via processor interface 1008. Memory 1020 is connected to processor 1002 via a memory interface 1022. Memory 1025 is connected to processor 1004 via a memory interface 1027. Graphics interface 1030 is connected to I/O interface 1010 via a graphics interface 1032 and provides a video display output 1036 to a video display 1034. In a particular embodiment, information handling system 1000 includes separate memories that are dedicated to each of processors 1002 and 1004 via separate memory interfaces. An example of memories 1020 and 1030 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 1040, disk controller 1050, and I/O bridge 1070 are connected to I/O interface 1010 via an I/O channel 1012. An example of I/O channel 1012 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 1010 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 1040 includes BIOS/UEFI code operable to detect resources within information handling system 1000, to provide drivers for the resources, initialize the resources, and access the resources. BIOS/UEFI module 1040 includes code that operates to detect resources within information handling system 1000, to provide drivers for the resources, to initialize the resources, and to access the resources.

Disk controller 1050 includes a disk interface 1052 that connects the disk controller to HDD 1054, to ODD 1056, and to disk emulator 1060. An example of disk interface 1052 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1060 permits SSD 1064 to be connected to information handling system 1000 via an external interface 1062. An example of external interface 1062 includes a USB interface, an IEEE 3394 (Firewire) interface, a proprietary interface, or a combination thereof. Alternatively, solid-state drive 1064 can be disposed within information handling system 1000.

I/O bridge 1070 includes a peripheral interface 1072 that connects the I/O bridge to add-on resource 1074, to TPM 1076, and to network interface 1080. Peripheral interface 1072 can be the same type of interface as I/O channel 1012 or can be a different type of interface. As such, I/O bridge 1070 extends the capacity of I/O channel 1012 when peripheral interface 1072 and the I/O channel are of the same type, and the I/O bridge translates information from a format suitable to the I/O channel to a format suitable to the peripheral channel 1072 when they are of a different type. Add-on resource 1074 can include a data storage system, an additional graphics interface, a network interface card (NIC), a sound/video processing card, another add-on resource, or a combination thereof. Add-on resource 1074 can be on a main circuit board, on separate circuit board or add-in card disposed within information handling system 1000, a device that is external to the information handling system, or a combination thereof.

Network interface 1080 represents a NIC disposed within information handling system 1000, on a main circuit board of the information handling system, integrated onto another component such as I/O interface 1010, in another suitable location, or a combination thereof. Network interface device 1080 includes network channels 1082 and 1084 that provide interfaces to devices that are external to information handling system 1000. In a particular embodiment, network channels 1082 and 1084 are of a different type than peripheral channel 1072 and network interface 1080 translates information from a format suitable to the peripheral channel to a format suitable to external devices. An example of network channels 1082 and 1084 includes InfiniBand channels, Fibre Channel channels, Gigabit Ethernet channels, proprietary channel architectures, or a combination thereof. Network channels 1082 and 1084 can be connected to external network resources (not illustrated). The network resource can include another information handling system, a data storage system, another network, a grid management system, another suitable resource, or a combination thereof.

Management device 1090 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 1000. In particular, management device 1090 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 1000, such as system cooling fans and power supplies. Management device 1090 can include a network connection to an external management system, and the management device can communicate with the management system to report status information for information handling system 1000, to receive BIOS/UEFI or system firmware updates, or to perform other task for managing and controlling the operation of information handling system 1000.

Management device 1090 can operate off of a separate power plane from the components of the host environment so that the management device receives power to manage information handling system 1000 when the information handling system is otherwise shut down. An example of management device 1090 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 1090 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a printed circuit board including a through hole via, the through hole via having top and bottom sections plated with a conductive plating material, and a middle section without any conductive plating material;
   a screw to be placed in physical communication with the top, middle, and bottom sections of the through hole via in the printed circuit board; and
   a processor to:
      determine whether an electrical circuit is formed between the screw, the top section of the through hole via, and the bottom section of the through hole via; and
      based on a determination of the electrical circuit being formed, provide a first indication that no intrusion has been made into the information handling system; and
   a conductive sleeve to be inserted within the printed circuit board, wherein the conductive sleeve to provide electrical communication between the screw, the top section of the through hole via, and the bottom section of the through hole via, and to provide proper alignment of the screw within the through hole via.

2. The information handling system of claim 1, further comprising a service panel in physical communication with the screw, wherein the service panel prevents access to components within the information handling system.

3. The information handling system of claim 1, wherein the conductive sleeve is a conductive rubber material.

4. The information handling system of claim 1, wherein based on a determination of the electrical circuit not being formed, provide a second indication that an intrusion has been made into the information handling system.

5. The information handling system of claim 1, wherein the PCB is a multiple layer board PCB.

6. The information handling system of claim 1, wherein the PCB is a high density interconnect PCB.

7. An information handling system comprising:
   a printed circuit board including a through hole via, the through hole via having top and bottom sections plated with a conductive plating material, and a middle section without any conductive plating material;
   a screw to be placed in physical communication with the top, middle, and bottom sections of the through hole via in the printed circuit board;
   a service panel in physical communication with the screw, wherein the service panel prevents access to components within the information handling system;
   a conductive sleeve to be inserted within the printed circuit board, wherein the conductive sleeve is to provide electrical communication between the screw, the top section of the through hole via, and the bottom section of the through hole via, and to provide proper alignment of the screw within the through hole via; and a processor to:
  determine whether an electrical circuit is formed between the screw, the top section of the through hole via, and the bottom section of the through hole via; and
  based on a determination of the electrical circuit being formed, provide a first indication that no intrusion has been made into the information handling system.

8. The information handling system of claim 7, wherein the conductive sleeve is a conductive rubber material.

9. The information handling system of claim 7, wherein based on a determination of the electrical circuit not being formed, provide a second indication that an intrusion has been made into the information handling system.

10. The information handling system of claim 7, wherein the PCB is a multiple layer board PCB.

11. The information handling system of claim 7, wherein the PCB is a high density interconnect PCB.

12. A method comprising:
  drilling a first partial via into a top surface of a printed circuit board;
  drilling a second partial via into a bottom surface of the printed circuit board;
  plating the first and second vias with a conductive plating material;
  drilling a through via to connect the first and second partial vias, wherein the through via includes top and bottom sections plated with the conductive plating material and a middle section without any conductive plating material; and
  inserting a conductive sleeve within the middle section of the through via.

13. The method of claim 12, further comprising: inserting a screw within the conductive sleeve, the middle section of the through via, and the bottom section of the through via.

14. The method of claim 13, wherein the screw forms a closed electrical circuit with the conductive sleeve, the first section of the through via, and the bottom section of the through via.

15. The method of claim 13, wherein the screw prevents an intrusion into an information handling system associated with the printed circuit board.

16. The method of claim 13, further comprising: securing a service panel and a c-cover to the information handling system with the screw.

* * * * *